(12) United States Patent
Gustafson

(10) Patent No.: US 9,998,918 B2
(45) Date of Patent: Jun. 12, 2018

(54) SATELLITE BASED KEY AGREEMENT FOR AUTHENTICATION

(71) Applicant: SD SCIENCE & DEVELOPMENT SA, Fribourg (CH)

(72) Inventor: Bo Gustafson, Gainesville, FL (US)

(73) Assignee: SD Science & Development SA, Fribourg (CH)

( * ) Notice: Subject to any disclaimer, the term of this patent is extended or adjusted under 35 U.S.C. 154(b) by 0 days. days.

(21) Appl. No.: 14/763,697

(22) PCT Filed: Jan. 24, 2014

(86) PCT No.: PCT/IB2014/058518
§ 371 (c)(1),
(2) Date: Jul. 27, 2015

(87) PCT Pub. No.: WO2014/115109
PCT Pub. Date: Jul. 31, 2014

(65) Prior Publication Data
US 2015/0365824 A1   Dec. 17, 2015

(30) Foreign Application Priority Data
Jan. 25, 2013   (CH) .......................................... 318/13

(51) Int. Cl.
*H04L 9/00* (2006.01)
*H04W 12/04* (2009.01)
(Continued)

(52) U.S. Cl.
CPC ........... *H04W 12/04* (2013.01); *H04L 9/0668* (2013.01); *H04L 9/0822* (2013.01);
(Continued)

(58) Field of Classification Search
None
See application file for complete search history.

(56) References Cited

U.S. PATENT DOCUMENTS 6,744,893 B1 *  6/2004  Fleming-Dahl ....... H04L 27/001
                                                       380/263
2003/0108202 A1   6/2003  Clapper
(Continued)

FOREIGN PATENT DOCUMENTS

WO       WO 97/13341        4/1997

OTHER PUBLICATIONS

International Search Report for PCT/IB2014/058518 dated Jun. 6, 2014, three pages.
(Continued)

*Primary Examiner* — Brandon S Hoffman
(74) *Attorney, Agent, or Firm* — Nixon & Vanderhye P.C.

(57) ABSTRACT

A method for deducing a quantity (θ), in two distinct locations, from further distinct measurable quantities. The method comprises the steps of observing with a first device (CD) the quantity (θ) from an intercepted signal, whereby the device is placed in a location with first coordinates ($X_i$, $Y_i$, $Z_i$); providing a second device (AS) in a location with second coordinates ($X_s$, $Y_s$, $Z_s$); causing the second device to transmit a signal to be intercepted by the first device (CD); whereby the second device (AS) needs to know the second coordinates and be informed of the first coordinates of the first device (CD) to calculate the quantity (θ) that can be obtained from measurements by the first device (CD); the quantity (θ) thereby being known by the second device (AS) and the first device (CD) without the need to communicate the quantity or any other value that is sufficient for a third device to deduce the quantity (θ).

22 Claims, 8 Drawing Sheets

(51) Int. Cl.
*H04L 9/08* (2006.01)
*H04L 9/06* (2006.01)
*H04W 12/06* (2009.01)

(52) U.S. Cl.
CPC .......... *H04L 9/0844* (2013.01); *H04L 9/0872* (2013.01); *H04W 12/06* (2013.01)

(56) References Cited

U.S. PATENT DOCUMENTS

2003/0182246 A1\* 9/2003 Johnson .................. G06N 7/08
705/76
2013/0236007 A1 9/2013 Munro et al.

OTHER PUBLICATIONS

Written Opinion of the ISA for PCT/IB2014/058518 dated Jun. 6, 2014, six pages.

\* cited by examiner

SATELLITE BASED KEY AGREEMENT FOR AUTHENTICATION

This application is the U.S. national phase of International Application No. PCT/IB2014/058518 filed 24 Jan. 2014 which designated the U.S. and claims priority to Swiss Patent Application No. 00318/13 filed 25 Jan. 2013, the entire contents of each of which are hereby incorporated by reference.

TECHNICAL FIELD

The present invention is in the field of authentication, whereby the authentication process involves a satellite, and makes use of an ever-changing encryption key.

BACKGROUND OF THE INVENTION

The use of a chaotic encryption key generator is known per se and there are several chaotic systems that are capable of being used to generate data encryption and decryption keys.

There are needs for secure data communication, information collection and storage, as well as needs to safeguard, control and protect access to sites.

Over time more or less secure systems have been used to address one or more of these needs starting with mechanical locks and spanning contemporary encryption technology. Perpetually these systems are challenged by perpetrators and hackers and in response ever-more advanced systems are developed.

Problems that the invention addresses include:
collect data with integrity;
securely transmit data; and
securely store data.

SUMMARY OF THE INVENTION

We here propose a solution that, depending on how it is applied, allows all of the needs to be met and that inherently resists tampering.

In a first aspect the invention is a method for deducing a quantity ($\theta$), in two distinct locations, from further distinct measurable quantities, the method comprising the steps of observing with a first device (CD) the quantity ($\theta$) from an intercepted signal, whereby the device is placed in a location with first coordinates ($X_i, Y_i, Z_i$); providing a second device (AS) in a location with second coordinates ($X_s, Y_s, Z_s$); causing the second device to transmit a signal to be intercepted by the first device (CD); whereby the second device (AS) needs to know (it may autonomously measure) the second coordinates and be informed of the first coordinates of the first device (CD) to calculate the quantity ($\theta$) that can be obtained from measurements by the first device (CD). The quantity ($\theta$) thereby is known by the second device (AS) and the first device (CD) without the need to communicate the quantity or any other value that is sufficient for a third device to deduce the quantity ($\theta$). The AS signal could be propagated by particles, electromagnetic radiation or any other type of carrier.

In a first exemplary embodiment, the quantity ($\theta$) is the range from the first device (CD) to the second device (AS).

In a second exemplary embodiment the quantity ($\theta$) is a function of the frequency of a carrier or of its embedded code, and the method further comprises the steps of measuring with the first device (CD) the frequency of the intercepted signal at the location with the first coordinates ($X_i, Y_i, Z_i$) and corresponding velocity components at time t; transmitting with the second device (AS) at a further frequency known to AS from the location with the second coordinates ($X_s, Y_s, Z_s$) and the corresponding velocity components also at the time t; whereby the second device (AS) only needs to be informed of the coordinates and velocities of the first device (CD) to calculate the Doppler shifted frequency that can be observed at the first device (CD); and the quantity ($\theta$) is assigned a numerical value based on the Doppler shifted frequency using a predefined algorithm so that the quantity ($\theta$) is known by the second device (AS).

In a third exemplary embodiment the method further comprises the steps of observing with the first device (CD) the quantity ($\theta$) using a predefined algorithm so that the quantity ($\theta$) is known by the first device (CD); each location illuminated by the signal broadcast by the second device (AS) having an associated quantity ($\theta$) at time t and each combination of first coordinates ($X_i, Y_i, Z_i$), time and second device (AS) corresponding to a given quantity ($\theta$), each of the associated quantity ($\theta$) and the given quantity ($\theta$) not necessarily being unique but a number of arbitrary length that can be created by joining numbers $\theta_t$ where t refers to a given time and $\theta_t$ represents the value $\theta$ obtained at time t, and this number being unique depending on the definition of $\theta$ and the mechanism generating the time dependency.

In a fourth exemplary embodiment, the quantity ($\theta$) is obtained from any combination of coordinates ($X_i, Y_i, Z_i$)$_t$ of the first device (CD) and second devices (AS), where the index t represents the quantity at a specific time t.

In a fifth exemplary embodiment the quantity ($\theta$) is obtained from any measurement at the first device (CD) whose value can be predicted at the second device (AS).

In a sixth exemplary embodiment, measurement using the signal transmitted by the second device (AS) does not permit ambiguity resolution of the range, and an algorithm that generates the quantity ($\theta$) from the least significant portion of the accurately measured distance can be used to generate a specific value for the quantity ($\theta$) that is also predictable with the information known to the second device (AS), the determination of the second coordinates of the second device (AS) from the signal S broadcasts is precluded due to ambiguity, so that the quantity ($\theta$) is only known at the first device (CD) and the second device (AS).

In a seventh exemplary embodiment, the invention provides a method for generating a chaotically time varying quantity ($\theta$) suitable for use in any one of the previously described methods, wherein the second device (AS) is located on a chaotically moving platform observable from the first device (CD).

In an eighth exemplary embodiment, the second device (AS) is located on an orbiting satellite with chaotic orbit, and the quantity ($\theta$) is an unpredictable time variable numeric, not known to any human and can therefore be used as a number generator free from human influence.

In a ninth exemplary embodiment, the inventive method further comprises steps for obtaining the quantity ($\theta$), known to no human, from observations made in only two locations, including autonomously measuring with the first device (CD) its position and velocity using any positioning device (PD) capable of determining the first coordinates ($X_i, Y_i, Z_i$), the corresponding velocities and the time; communicating from the first device (CD) the measured parameters from the preceding step to the second device (AS); receiving at the second device (AS) the measured parameters from the first device (CD); autonomously measuring at the second device (AS) its position and velocity using any positioning device (PD) capable of determining the second coordinates ($X_s$, $Y_s$, $Z_s$), the corresponding velocities and the time; calculating at the second device (AS) an observable that can be measured at the first device (CD); and generating at the second device (AS) the quantity ($\theta$). The first device (CD) is enabled to measure the same observable and therefore can calculate the quantity ($\theta$).

In a tenth exemplary embodiment, the second device (AS) is on an orbiting platform in chaotic orbit as previously described, the quantity ($\theta$) thus being unpredictable as well as unknown to any human as long as the satellite orbit cannot be independently determined.

In an eleventh exemplary embodiment, the inventive method is for obtaining the quantity ($\theta$), known to no human, from observations made in only two locations.

In a twelfth exemplary embodiment, the measured quantity at the first device (CD) is the ambiguity laden range or distance to an orbiting satellite, whereby the coordinates ($X_i$, $Y_i$, $Z_i$) of the first device (CD) and the time t are measured and communicated to the second device (AS), the second device (AS) measures only its position ($X_s$, $Y_s$, $Z_s$) and the time before the second device (AS) is capable of calculating the quantity ($\theta$) from coordinate sets corresponding to matched times, and the quantity ($\theta_{i,t}$) corresponding to epoch t and first device ($CD_i$) is a variable of the time t and depends on the first device ($CD_i$).

In a thirteenth exemplary embodiment, the method further comprises the steps of using the quantity ($\theta$) to generate an encryption key K known only at the first device (CD) and the second device (AS) thereby allowing secure communications between the second device (AS) and the first device (CD); repeating the preceding step of using the quantity to generate an encryption key for any number of first devices ($CD_i$), each of which has a corresponding quantity ($\theta_i$) and encryption key ($K_i$). All encryption keys are known at the second device (AS), which allows secure communication by way of the second device (AS) where each encryption key ($K_i$) is used to decrypt a message from the corresponding first device ($CD_i$), and the message is then encrypted with a different key ($K_j$) and sent to the first device corresponding to the different key ($CD_j$).

In a fourteenth exemplary embodiment, the method is for obtaining the same quantity ($\theta_i$), from observations made in only two locations and communicating securely using a site (MS) as a relay; and the method further comprises the steps of securely communicating the information used by the second device (AS) to generate the encryption keys, to any first device (CD) which is now capable of generating any key ($K_i$); using the site MS as a relay station allowing secure communication between any first device ($CD_i$) with any other first device ($CD_j$).

In a fifteenth exemplary embodiment of the inventive method, the quantity ($\theta$) or the encryption key K is used to verify the location of the first device CD, and the method further comprises the steps of using one or more second devices (AS) to create each a corresponding quantity ($\theta$) or encryption keys, thereby enabling a consistency check on the origin of a message, whereby a second device (AS) or site (MS) may perform a check on the consistency between the quantity ($\theta$) or encryption key with a certain location of the communicating first device (CD); using of three or more second devices (AS) to enable a determination of the location of a ground based communicating first device (CD); and using of four or more second devices (AS) to enable an estimate in the accuracy of the calculated first coordinates for first device (CD).

In a sixteenth exemplary embodiment, the quantity ($\theta$) is used to estimate the location of the first device (CD), and the method further comprises the step of calculating a unique set of coordinates corresponding to the first device (CD) when four or more second devices (AS) are used.

In a seventeenth exemplary embodiment a message can only be decrypted at a given location or combination of location and time, whereby the message can be a key or other means to manipulate text, locks or other devices.

In an eighteenth exemplary embodiment, a message can only be decrypted at a given location and at a given time in the presence of a first device (CD).

In a nineteenth exemplary embodiment, the second device(s) (AS) is(are) an(each an) Authentication Satellite in orbit around a planet.

In a twentieth exemplary embodiment, the first device (CD) is a communication device located on or in vicinity of the surface of a planet.

In a twenty-first exemplary embodiment, the first device (CD) is a communicating device on an orbiting satellite or on an airborne platform such as a drone.

In a twenty-second exemplary embodiment, the second device(s) (AS) is(are) located on or near the ground, is fixed or in motion.

In a twenty-third exemplary embodiment, any one of the methods described herein above is used for generating authenticated cadastral records.

In a twenty-fourth exemplary embodiment, any one of the methods described herein above is used for generating authenticated samples.

In a twenty-fifth exemplary embodiment, the step of causing the second device to transmit a signal makes use of a swept narrow beam, whereby the narrow beam is produced such that a carrier beam ground footprint lies in the meter range, and whereby the quantity ($\theta$) of the narrow beam cannot be deduced outside of the narrow beam, the method further comprising sweeping the narrow beam over an area of interest until a key is received by a receptor.

In a twenty-sixth exemplary embodiment, the narrow beam is produced using a beam expander in conjunction with an IR laser.

In a twenty-seventh exemplary embodiment, the quantity ($\theta$) of the narrow beam cannot be deduced outside of a narrow volume surrounding the first device (CD).

In a twenty-eighth exemplary embodiment, the coordinates of the first device (CD) are transferred to the second device (AS) using an encrypted message.

In a twenty-ninth exemplary embodiment, a message is sent to multiple destinations to avoid mapping of message traffic, the message being only decryptable at the location of the intended recipient.

In a thirtieth exemplary embodiment, a person or set of persons prove(s) to be associated with the first device (CD) using any association method and this association is used as identification of the person(s).

In a thirty-first exemplary embodiment, a person or set of persons prove(s) to be associated with the first device (CD) using any association method and this association is used to assign rights to the person(s).

In a thirty-second exemplary embodiment, a device proves to be associated with the first device (CD) using any association method and this association is used to assign rights to the device, to program the device or otherwise change its properties.

In a thirty-third exemplary embodiment, a person or set of persons prove(s) to be associated with the first device (CD) and is assigned right to generate or modify cadastral data.

In a thirty-fourth exemplary embodiment, a person or set of persons prove(s) to be associated with the first device (CD) and is assigned voting rights or other rights.

In a thirty-fifth exemplary embodiment, the quantity (θ) is used to generate directives.

In a thirty-sixth exemplary embodiment, the quantity (θ) is used to generate new coordinates for the first device (CD) thereby testing the association or control a person has over the first device (CD).

In a thirty-seventh exemplary embodiment, new coordinates are sent to the first device (CD) that allows the second device (AS) to control the location of the first device CD and thereby assign a site for sample collection or other activity.

Using the apparatus and methods described in this document, digital data is collected, transferred and stored in a manner designed to withstand unauthorized access and mitigate tampering due to corruption, coercion or other fraudulent intent. Data stored in this manner can be made immune to natural and manmade disasters on the ground including war, and like a secure time capsule it can be made completely inaccessible during specified time periods. Access to stored data using constantly changing encryption keys can be restricted in location and time and can be programmed for time and geo-referenced access anywhere a satellite signal can be tracked. Access restrictions could be used to control a database, access to fixed- or mobile-containers and could be time dependent. Mobile containers could for example be accessible only under certain conditions such as when they are in specified locations and at times when those locations are secured, such as checkpoints along transportation routes and at border crossings. The data transfer portion of this invention can be used for any data, voice, or video transaction requiring a high level of integrity.

BRIEF DESCRIPTION OF THE FIGURES

The invention will be better understood with the description of exemplary embodiments and in reference to figures, wherein.

LIST OF TERMS AND ABBREVIATIONS

Figure 1:
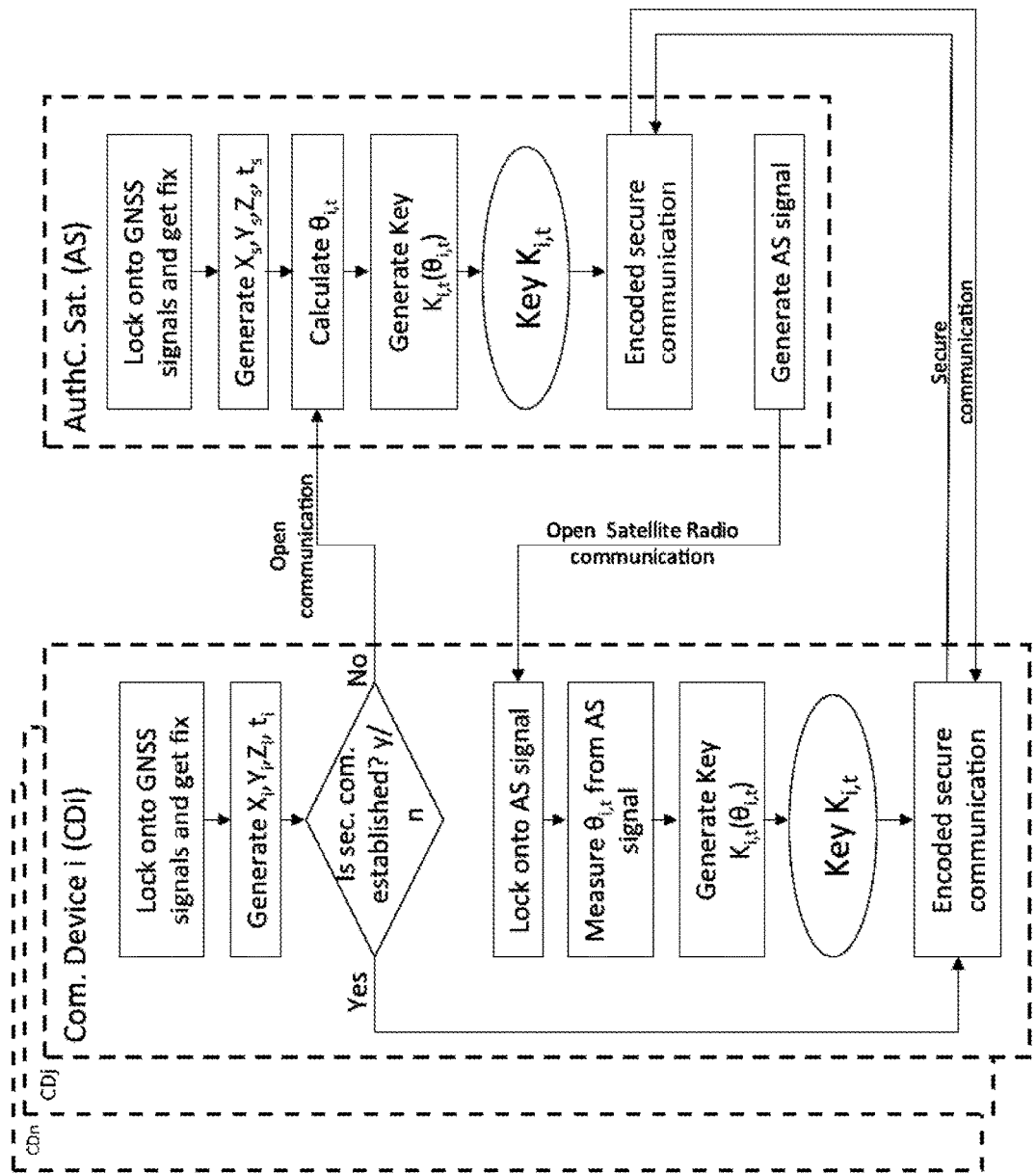
FIG. 1 illustrates a flowchart for a secure communication between Communication Device i [1 . . . n] labeled "CDi" and an Authentication Satellite labeled "AS"

The following is a list of terms and abbreviations, which are used throughout the present description, and are defined in the present section.

AuthC: Authentication (Established abbreviation typically used by the application security community)

AS: Authentication Signal broadcast from a satellite

CD: Communication Device equipped with a receiver capable of measuring the quantity θ and preferably with a PD.

CTS: Collect, Transceive, Store. The word Transceive is a contraction of Transmit and Receive.

Decryption: The process of decoding messages (or information) provided in an unreadable ciphertext. The inverse of encoding.

DSS: Data Storage Satellites

Encryption: The process of encoding messages (or information) in such a way that eavesdroppers or hackers cannot read it, but that authorized parties can. In an encryption scheme, the message or information (referred to as plaintext) is encrypted using an encryption algorithm, turning it into an unreadable ciphertext. This is usually done with the use of an encryption key, which specifies how the message is to be encoded.

GNSS: Global Navigation Satellite System whereof GPS is the first and the best known GPS: Global Position System Key: Encryption or decryption key using any encryption scheme.

MS: Main Station. A permanently secure site with known coordinates equipped with a Satellite Communication Device (SCD). This may be a physically secure ground station or an PD equipped satellite.

PD: Positioning Device. Can be any device capable of determining its position in for example Earth Centered Earth Fixed (ECEF) coordinates X, Y, Z, e.g.: GPS or any GNSS receiver RFID: Radio Frequency Identification RS: Relay Satellites SBA: Satellite Based Authentication SSD: Solid-State Drive, a data storage device that uses integrated circuit assemblies as memory to store data persistently. SSD technology uses electronic interfaces compatible with traditional block input/output (I/O) hard disk drives. SSDs do not employ any moving mechanical components, which distinguishes them from traditional magnetic disks such as hard disk drives (HDDs).

VRS: Virtual Reference Station or VRS (VRS is a trademarked term of Trimble Navigation) is one of several widely available base-station reference data services whereby a virtual base station is created in a specified coordinate or near that coordinate.

θ: A quantity that depends on the position of a receiver relative an Authentication Satellite (AS) and can be measured or calculated from measurements. E.g., Range (or distance to an AS), difference in range with respect to the distance to a reference GNSS satellite, epoch (in GPS time) of the reception of an AS signal, or the Doppler shift of the AS signal.

DETAILED DESCRIPTION OF EXEMPLARY EMBODIMENTS

In overview, it can be said that the invention makes use of the following hardware entity(ies):

One or more Authentication Satellite (AS)

To collect data the following addition should be considered:

A Positioning Device (PD) equipped collector with AS tracking

To transmit data the following addition should be considered:
  A Communication Device (CD)
To Store Data the following addition should be considered:
  Data Storage Satellites (DSS)
To increase capacity the following addition should be considered:
  Main Station (MS) with high bandwidth communication capability
  more Data Storage Satellites (DSS)
To increase coverage the following addition should be considered:
  more Authentication Satellites (AS)
  Relay Satellites (RS)

Satellite Based Authentication (SBA)—Overview

The following will provide an explanation about Satellite Based Authentication (SBA) and how this can be used for secure communications, data forgery mitigation, and anti-corruption.

SBA makes use of any standard data encryption algorithm to secure and authenticate data and data transmission. The main idea behind SBA relates to the encryption keys, the way they are created and shared.

The keys are never communicated and can therefore not be siphoned off from a communication link.
Keys can be perpetually regenerated and do not need to be stored.
There can be a unique key sequence for every site and time combination.
The keys cannot be predicted.

How does it Work?

A source number from which the encryption key is generated changes perpetually following an unpredictable pattern. This source number is specific to the combination of an authentication satellite and a communication site and can be independently obtained from measurements made at either end of the communication line only. The customer end needs no a priori information except for the authentication satellite's signal, which may be made freely available without compromising integrity. The satellite end needs to know what coordinates it should send information to and accept communications from. This may include time restrictions.

Usage

Besides enabling communications with an unprecedented level of security even over unsecure channels (such as cell phones and the internet), the unique key sequence defines the customer location and the time. Encrypting or otherwise embedding this sequence in a data stream assures that the author/data-collector occupied that location at the time; else the correct key could not be obtained. The encoding key constitutes a form of authentication. This can be used to ensure for example the integrity of a land survey or cadaster. Actions (a measurement or recording, sample collection, etc.) claimed to be made at a certain site and time and authenticated with SBA cannot be forged or altered since the correct sequence cannot be predicted or obtained in any way other than through data collection at that site and time. The apparatus and procedures described herein are suitable for use by a workforce with minimal training and supervision. The intent is to enable stakeholders who may not afford professionally trained staff to do their land survey, or to collect environmental samples, to carry out that work on their own. For their work to be accepted it must be tamper proofed.

Examples

SBA may enable "presidential red phone" or "hotline"-level confidential conversation and data exchange over cell phones and the internet.
SBA can be used to assure the time and place of the placing of an electronic seal or lock, and also to record and or authorize the unlocking site and time.
A text can remain unintelligible until it becomes legible at a defined location and time interval only.
Stakeholders may survey their own land and create cadastral documents that may be fully trusted.
Individualized internet content and Pay TV services may become secure and free from Piracy.

2.4 How is it Possible?

All of the enabling technology is mature and well understood. A customer communication device uses measurements analogous to those routinely made using GPS receivers to define a quantity θ which is unique to that location and time. θ is here only used as a number from which the key is generated. This quantity could for example be the least significant digits in the range or distance D to the authentication satellite or it could be the rate dD/dt of distance change conveniently given by the Doppler shift.

The significant digits of a number are those digits that carry meaning contributing to its accuracy. The rightmost figures are the least significant ones and are selected because they are rapidly changing, are unpredictable and can be measured without the most significant digits to the left being known. The satellite orbit information is safeguarded by assuring that the whole number D cannot be measured.

The satellite may obtain the same quantity θ if it is equipped with a GPS or other GNSS receiver to measure its coordinates $X_s$, $Y_s$, $Z_s$. This measurement along with the coordinates X, Y, Z of the intended correspondent allows the satellite to compute the distance or range $$D=\sqrt{(X-X_S)^2+(Y-Y_S)^2+(Z-Z_S)^2}.$$

Velocities or other obtainable/measurable parameters may also need to be measured depending on the definition of data.

Now the source number θ from which the encryption key is generated is known at both ends of the communication line but nowhere else.

Keys May be of Arbitrary Length

New keys may be generated at arbitrary time intervals as a new number sequence may replace an older sequence or a certain number of sequences may be conjoined into longer sequences. For example the oldest sequence may be dropped and the string shifted as new sequences are generated and joined.

What Makes the Keys Unpredictable?

The orbit of a satellite is chaotic at the level of measurement accuracies of several meters or better at any altitude due to non-gravitational forces including atmospheric drag and radiation forces. The perturbations in Low Earth Orbit (LEO) are much larger. This makes the ranges unpredictable. We note that a decimeter size satellite without protruding solar panels or antennas vanishes among orbital debris and is at the limit of state of the art detection from the ground. There are more than 600,000 objects larger than 1 cm in orbit (according to the ESA Meteoroid and Space Debris Terrestrial Environment Reference, the MASTER-2005 model) and the majority of expected objects in this size range remain undetected. Still, working out an orbit is possible using the NASA Orbital Debris Observatory (en. wikipedia.org/wiki/NASA_Orbital_Debris_Observatory%22%20%5Co%20%22NASA%20Orbital%20Debris%20Observatory) or similar and spending much time and effort, but to get a precise orbit at a few meters level for a smallsat in LEO is probably not possible. Working against us is the fact that the satellite will broadcast a beacon. However, that beacon can deliberately be made unusable for precise orbit determination. One way is to cause ambiguities that prevent the most significant digits in the distance D from being determined from measurements.

Implementation: How Costly is a SBA System?

At least one AS satellite is needed. A ground station to service the AS is probably also needed and desirable since there are ways to improve the number of customers that can be served by using a ground station as an intermediary. This allows key generation to be the sole purpose of the satellite. This in turns allows the satellite to be a low cost cubesat or similar in the 1 to 3 kg estimated mass depending mostly on the desired broadcast power. Higher power allows better signal availability. Orbit and electromagnetic spectrum allocation rules need to be adhered to or negotiated.

Satellite Based Authentication (SBA)—Detailed Description

Communication Using Dynamically Changing Encryption Keys—Known to No Human

It is referred to FIG. 1, in which is illustrated a flowchart for a secure communication between Communication Device i [1 . . . n] labeled "CDi" and an Authentication Satellite labeled "AS". An encryption key to communicate with a specified location $X_i$, $Y_i$, $Z_i$ only, valid at a specific time, $t_i$, can be generated from measurements made at the Authentication Satellite (AS) and a matching key can be generated from a different measurement that can only be made at the location $X_i$, $Y_i$, $Z_i$ at time $t_i$. Communication Device (CDi) can therefore securely communicate with the satellite without ever exchanging or storing a key. That key can only be obtained at the satellite and at the location $X_i$, $Y_i$, $Z_i$ occupied by CDi, no measurement can be made that allows the key to be obtained at any other location and no information that can be used to pirate the key is ever communicated or stored. Communication Device CDi can now safely communicate with any other Communication Device CDj using an AS as intermediary. The code sent from CDi at time $t=t_i$ is decrypted at the AS using Key $K_{i,t}$ and re-encrypted using Key $K_{j,t}$ before it is transmitted and decoded at CDj. The time is obtained from GNSS measurements and t can remain equal to $t_i$ by adding a cache memory to AS where coordinates and epoch $X_s$, $Y_s$, $Z_s$, $t_s$ are stored (not shown) or may be redefined to $t=t_s$. We note that the key may be updated at arbitrary intervals. Longer intervals may make the memory cash obsolete.

Figure 2:
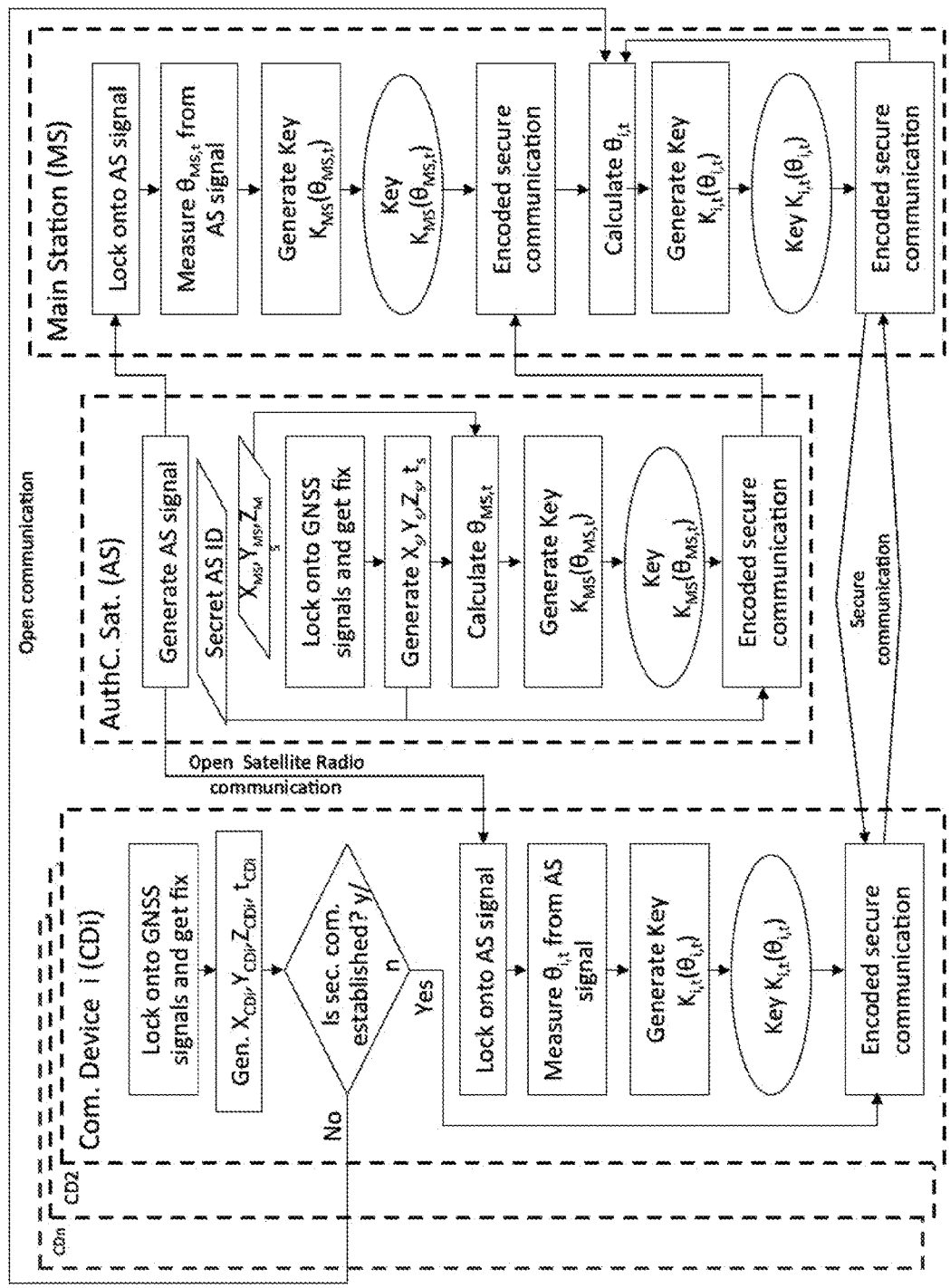
FIG. 2 illustrates a flowchart for a secure communication between Communication Device i [1 . . . n] and a Main Station using an Authentication Satellite.

Reference is now made to FIG. 2, in which a secure communication between Communication Device i [1 . . . n] and a Main Station using an Authentication Satellite is illustrated using a flowchart. An improvement that reduces power at the satellite, increases the number of supported devices n and communication bandwidth as well as guards against the insertion of a rogue or fake AS is the use of a ground station here called Main Station (MS) with permanently defined coordinates expecting to communicate with a given satellite that broadcasts its identity only to the MS using its secure communication mode. This AS ID, which remains secret and the MS coordinates can be preprogrammed in the AS.

In the here proposed approach, whole or partial encryption keys are obtained from the AS signal by measuring a quantity θ which could be any of a number of parameters that depend on the trajectory of a satellite $[X_s, Y_s, Z_s](t)$ and the location of the Communication Device CDi $[X_i, Y_i, Z_i]$ that may also be dependent on the time t. Example of a suitable parameter θ is the difference $\Delta D/\Delta t=(D_t-D_{t-\Delta t})/\Delta t$ in the distance $D_t=\sqrt{(X_{i,t}-X_{s,t})^2+(Y_{i,t}-Y_{s,t})^2+(Z_{i,t}-Z_{s,t})^2}$ or range between CDi and the satellite AS at time t and at the earlier epoch t−Δt. Another is the time derivative dD/dt which is velocity projection manifested in the Doppler shift in the AS signal carrier frequency as well as the code or chip frequency. Even the least significant digits in the range D is suitable but not the ambiguity resolved distance $D_t$ so the distance $D_t$ will deliberately be made hard or impossible to measure. This is because the satellite position could otherwise be determined given a sufficient number of ranging measurements from known coordinates.

The measurements at CDi are therefore to be performed at a predefined intended communication location and the coordinates of CDi need to be known at the satellite AS. These coordinates can be measured using a GPS receiver or similar device and may be communicated over an open network since knowing the CDi coordinates $X_i$, $Y_i$, $Z_i$ is insufficient to recreate the key $K_{i,t}(\theta_{i,t})$. Sufficient information to generate $K_{i,t}(\theta_{i,t})$ is unknown to all including to the operators of the system. The satellite however can determine its own position and can calculate the parameter $\theta_{i,t}$ corresponding to the intended communication point where CDi is located. The Authentication Satellite AS therefore also can obtain the key $K_{i,t}(\theta_{i,t})$. The encryption key continually updates itself as the satellite moves along its orbit. The intended communication location and the satellite position all along the orbit must be known in real time for the key to work. A key generated in any location j different from the intended communication location i (j≠i) will be different and any data sent to the satellite using an encryption key different from the expected key will not be decrypted or accepted and similarly any data sent from the satellite cannot be decrypted with a key obtained in a location j≠i.

We note that at any instant the range D is shared by all points on a sphere of radius D centered on the AS satellite and that the intersection with the Earth's surface may be approximated by a circle. As the satellite moves along its orbit the location of points sharing range and time series combinations are to a first approximation on a circle intersecting the ground in two points. We refer to these as mirror points. The circle deteriorates as the orbit deviates from a Keplerian orbit and becomes chaotic. The symmetry then deteriorates and the mirror point vanishes. Similar near symmetries may also be found for choices of θ≠D. The conditions when this occurs depend on the way a numeral is extracted from θ. A rugged and conceptually simple remedy is to use more than one Authentication Satellite to generate the key.

The satellite's orbit has a chaotic perturbation. The orbit is therefore unpredictable which makes it usable as a chaotic key generator. A chaotic key generator is noting novel per se and there are several chaotic systems that could be used at a lower cost and at greater ease. However, the advantages of this system are:
1) It generates keys that are specific to a location and time. There is a time dependent key corresponding to every location in space. If the key is made to depend on a sequence of θ-measurements obtained over a time interval, the key becomes unique to that point when the interval is sufficiently long.

2) It allows any party to retrieve the chaotically changing key that corresponds to the place they occupy, directly from the publicly broadcast AS signal at any location with a direct line of sight to the AS satellite. But the key is only valid for that time, so if a site is unsecured and a perpetrator obtains a key for that location, the key will cease to work as soon as they leave the premises.

3) Comparing keys allows verification that the party is (was) at a given location at a given time. Only the key generator (on the satellite AS or when enabled, on the secured station MS) can calculate the key and perform the test if the key supplied is consistent with a claimed location.

This strategy is based on the fact that the trajectory of a satellite is generally predictable only to the level of meters or worse while a change in range as a function of time or some parameter related to it, like the carrier phase change with time or Doppler shift, can be measured to the level of centimeters per second. It may also be possible to measure differences in distance to the AS and GNSS satellites with similar cm range accuracy, at least if GNSS correction data are supplied for example by one of several public Virtual Reference Station or VRS (VRS is a trademarked term of Trimble Navigation) providers.

A satellite navigation system with global coverage may be termed a global navigation satellite system or GNSS whereof the US Global Positioning System or GPS is best known. Also navigation satellite systems with local coverage, pseudo-satellites or "pseudolites" mimicking Nav. Sats. while on the ground and similar devices may be used for the purpose discussed here.

We envision the use of small satellites that feature large drag to mass ratios and experience large non-gravitational force induced accelerations, especially in Low Earth Orbit (LEO) where the atmosphere is the dominant source of drag. As the predictability of the orbit degrades, possibly to hundreds of meters or worse, longer keys can be generated and still not be predictable. The satellite never broadcasts its orbit and is too small to be accurately tracked using ground radar and has no lidar reflector. It also only transmits a repetitive short sequence code or employs other strategies to make ranging measurements inaccurate or intractable. This makes any attempt at orbit determination from the AS signal inaccurate. The short code AS signal is intended to allow a receiver to lock onto the signal but there is no information on when the signal was transmitted so ranging is intentionally ambiguous and only the least significant part of the ranging information is used to generate the key. This could be determined using the code or carrier phase and does not need to be the actual ambiguity resolved range. This type of ambiguity is well known in GNSS measurements where it is unwanted, here we intentionally make sure the ambiguity cannot be resolved to protect information on the AS satellite's orbit. The satellite is thus used as an encryption key generator that uses unpredictable non-gravitational orbit perturbations to continually change a key which in addition is specific to a location. Because this key is known or can be calculated at the satellite and can be obtained from measurements at the corresponding specific locations, the key can be used in highly secure communications.

The more accurately the coordinates $X_i$, $Y_i$, $Z_i$ at the intended communication location, i, are known, the higher the $\theta$ measurement precision can be and the longer the key segment corresponding to a single $\theta$ measurement can be. But the precision used should not be higher than the measurement accuracy accounting for all AS measurement errors at the $CD_i$ as well as positioning errors at $CD_i$ and AS, or the $\theta$ obtained at the satellite may differ from that at $CD_i$ resulting in key mismatch. The higher the usable precision is, the tighter the secured volume about the Communication Device $CD_i$ can be. Using VRS or other base-station data, accuracy performance in the centimeter range may be expected (Hu, G. R., and H. S. Khoo, P. C. Goh, and C. I. Law, "Development and Assessment of GPS Virtual Reference Stations for RTK Positioning," *Journal of Geodesy*, Vol. 77, p. 292-302, 2003). Implementation (Retscher, G., "Accuracy Performance of Virtual Reference Station (VRS) Networks," *Journal of Global Positioning Systems*, Vol. 1, No. 1:40-47, 2002) with sophisticated hardware and software could be used for the tightest security volume (a secure cocoon or bubble) while broader and fuzzier boundaries are obtainable with less expensive implementations.

Authentication Signal Satellites

Figure 3A:
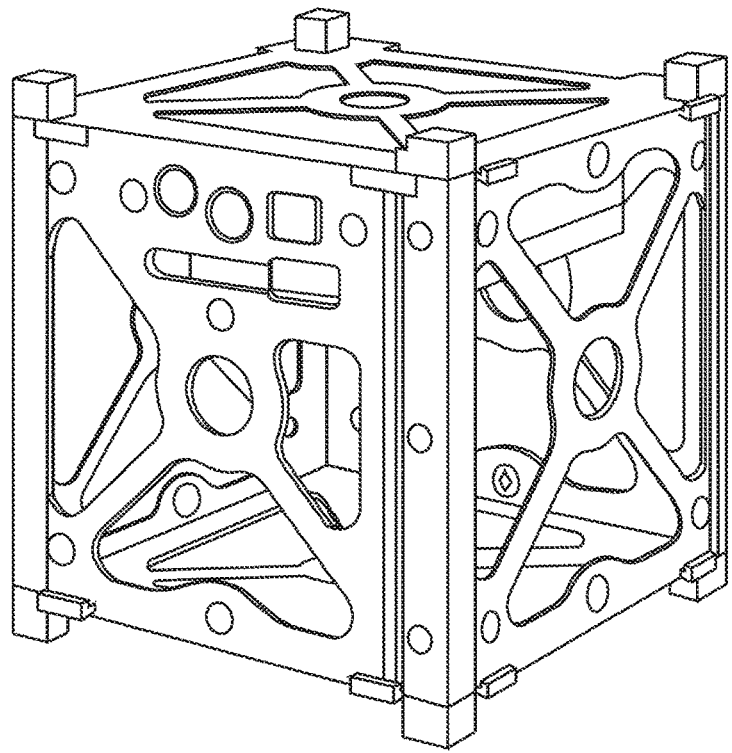
FIG. 3 illustrates examples of possible structures on which an encryption key satellite could be built according to the invention, picture 3A illustrating a standard 1U cubesat kit 10 cm to the side and picture 3B showing a similarly sized but even simpler tubesat kit by Interorbital Systems.
Figure 3B:
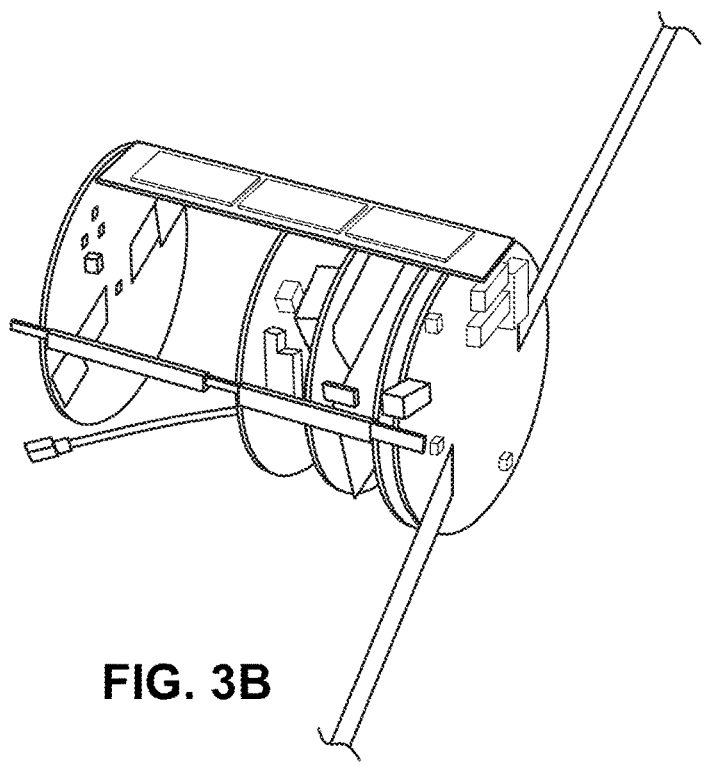

We envision AS satellites that may be used solely to broadcast the AS signal. The satellites can thus be relatively simple, small and inexpensive. The requirements are rather similar to the famous Sputnik of 1957 although, beyond the payload carried by Sputnik which was a beacon generator and hardware to broadcast that beacon, the AS payload also includes a positioning device (PS) that may be a precision GPS (GPS, GNSS or other means capable of generating the coordinates $[X_s, Y_s, Z_s](t)$ in the same coordinate system as the positioning device on the CDs.) receiver to determine the satellite's position and a processor to calculate the encryption key accounting for the coordinates of authorized communication sites. Satellites could be made using standardized cubesat or similar kits (see FIGS. 3 and 3*a*) and a space hardened version of a commercial precision GPS such as DataGrid's DGRx. The satellites need no moving or unfolding parts except for a simple and reliable communication antenna. The attitude control could at least for low inclination orbits be based on magnetic hysteresis which allows the payload to fit within the 2U or possibly 1U standard. These satellites are low mass (1 to 2 kg estimated), simple, reliable and low cost at probably under $100 k to build in quantities. In addition they are hard to track using ground radar and their orbits change constantly due primarily to drag and insolation induced forces. These inexpensive and small satellites are rugged and stealth and they can be placed in orbits that cause the satellites to self-destruct after a few months to a few years and burn up in the atmosphere leaving no trace. Nothing in principle prevents use of any orbit including sun synchronous or geostationary which allow much longer orbital lifetimes. It may be suitable to add a device such as an airfoil or a thruster depending on the orbit to deliberately enhance orbital perturbations.

We note that satellites in LEO are below much of the ionosphere which eliminates ionospheric errors in measurements of the quantity $\theta$. But other orbits may have their own advantages such as exposure (geostationary), power (sun synchronous) etc. . . . . It also is likely that defunct or decommissioned Navigation satellites or communication satellites could have adequate functionality to act as ASs even if their orbits may be suboptimal.

As an example we consider the possibility that a satellite like Naystar (GPS) SVN32 could be reused as an Authentication Satellite. SVN32 was decommissioned from active service on 17 Mar. 2008, and resumed transmitting L-band signals, still as PRN01, on 24 Sep. 2008—See link http://gge.unb.ca/Resources/GPSConstellationStatus.txt.

The satellite was set unhealthy and not included in almanacs (ref. NANU 2008111). L-band transmissions were discontinued on 16 Oct. 2008 (ref. NANU 2008130). However SVN32 remains a "reserve" satellite near slot F1. 3.3. Another candidate is SVN49 and there are other reserve satellites or decommissioned ones in or near active navsat orbits or permanently decommissioned ones in so called graveyard orbits.

ESA has its Galileo In-Orbit Validation Experiment satellites GIOVE-A and GIOVE-B satellites similarly in graveyard orbits and it seems like GIOVE-B retired in 2012 see link http://www.esa.int/Our_Activities/Navigation/Mission_accomplished_GIOVE-B_heads_into_deserved_retirement—with its advanced signal capabilities could be well suited for testing and validation of the proposed SBA system and potentially could be reprogrammed and operated as a working AS satellite. GIOVE-A seems to be operated by prime contractor Surrey Satellite Technology Ltd of Guildford, UK, to gather radiation data and performance results from a GPS receiver but could otherwise be equally usable as a satellite—see link http://www.esa.int/Our_Activities/Navigation/Mission_accomplished_for_Galileo_s_pathfinder_GIOVE-A.

CD/Person Association

In addition, there are applications in which the person associated with a SBA CD should be identified. A future user may be anticipated to have an App in their Smartphone to for example scan the user's iris. The user may resort to this identifying method as needed to prove that a specific CD is in their possession. Other ID means may be implanted chips or RFIDs but whatever method may be used, we claim that the CDi can be used with that ID device to prove presence and possession of a specific CD.

Continuity Issue

When, an AS signal is subject to the properties of electromagnetic waves or otherwise normally has properties that are continuous functions of location and time, it is intentionally made spatially and/or temporarily discontinuous or as close to it as is possible. This is to avoid interpolation, extrapolation, or otherwise use of models to predict or guess the properties of the signal at the location of the CD based on monitoring of the AS signal at other locations.

Practical implementations to achieve this may use a swept narrow beam. This is made practical if a beam expander is used in conjunction with an IR laser resulting in a carrier beam ground footprint in the meter range. The beam is swept over the area of interest until the key is received by the receptor. Successful reception is acknowledged through the broadcast of an encrypted acknowledgement message. Only a correctly encrypted message can originate from the intended customer. Any incorrectly encrypted message would either indicate an interception attempt or unsuccessful signal reception and is not accepted as an indication of success.

Alternative means to approximate a broadcast that is difficult to model include the use of low power levels or multiple interfering beams that could be broadcast by independent SBA platforms. Beams with finite Orbital Angular Momentum (OAM) may also be used.

Safeguard Against False AS Signals

While the AS knows that an entity responding to its messages using he correct encryption key is at the intended location, the CD cannot during first communication (before the first key is generated) as easily know that the AS is legitimate and not an intruder pretending to be a legitimate SA. When the CD obtains its first key, it must therefore make sure it was obtained from AS before starting to communicate sensitive data. A possible procedure is to a) Establish communication with the MS.
b) Request secure communication for device CD defined by its coordinates that are now given to the MS.
c) The AS sends a test message.
d) The MS informs the user at CD of the time of this initial communication(s) but only after the fact.
e) The user now knows that the message received with that timestamp or set of timestamps was sent by the legitimate MAS. The initial communication has now taken place and a shared encryption key exists.

It may under some instances be preferable to retain this initial key or a derivate of it as a portion of the key used in subsequent communications.

Messages generating new keys might be accepted only after a message stating the epoch of its timestamp is received. This timestamp message is encrypted using the preceding legitimate key which signals to the CD that the message originated with the legitimate AS.

Attempts to Use Recorded Signals

The requirement for response (two-way) communication eliminates the possibility to use recorded signals to foil the system.

A second method to foil attempts to send false keys to the CD should one way communication be required uses a second (or more) AS antenna who must receive a θ with a known (to the SBA satellite and MS) offset as a function of time. In the case of rebroadcast, the offset will not match unless the geometry including the time dependent Pointing-vector is reproduced and the Stokes vector of the AS beam must be recreated if three or more antennas are used at CD. The combination of multiple (known to the AS transmitter) reception antennas or multiple CDs used together eliminates or at least mitigates vulnerability to rebroadcast.

Anti Mapping

Traffic mapping can be mitigated by broadcasting messages (=sending to a large number of addresses) but only the intended recipients can decipher it.

Trusted Correspondents:

Anti-spam and anti-Nigeria mail/SMS. Unless the mail or SMS has the correct θ, it will not be accepted. Only a MS can generate the correct θ for a given CD. The CD will therefore know if the communication was sent by someone authorized to contact the CD by SBA.

Communication Applications

Secure Calls

Consider the user of a cell phone, or of any other device communicating on an unsecure means of digital information transfer (such as the internet, cellular phone network or land lines) to transfer sensitive data such as credit card information or effectuate a bank transfer. Maybe the need is to communicate sensitive matter with colleagues at work or "just" wishing to have a private conversation that cannot be overheard. We propose the use of the system illustrated in FIG. 2.

1) To initiate a secure communication, the cell phone, mobile computer or other communication device i (CDi), obtains its position $X_i$, $Y_i$, $Z_i$ from a Positioning Device (PD). This PD could be a standard built-in GPS or any device capable of determining Earth Centered Earth Fixed coordinates.

2) The communication device CDi sends the $X_i$, $Y_i$, $Z_i$ coordinates over the regular unsecured network to the secure communications provider located at the device labeled Main Station or MS in FIG. 2.

3) Either:
a) The secure communications provider at the MS sends these coordinates $X_i$, $Y_i$, $Z_i$ on to the Authentication Satellite (AS). The AS satellite returns the encryption keys to the secure communications provider by way of the established secured communication with the Main Station (MS). (This option is not depicted in FIG. 2.)

b) Or (as depicted in FIG. 2), the secure communications provider receives at the MS from the AS, the AS satellite coordinates $X_s$, $Y_s$, $Z_s$, $t_s$ using the secure communication link. The encryption keys corresponding to any coordinates can now be calculated at the MS.

4) The provider now has at MS, encryption keys to decrypt received messages from the CDi at $X_i$, $Y_i$, $Z_i$ and encrypt its messages. It is ready to start using secure communication mode with the user of CDi at $X_i$, $Y_i$, $Z_i$.

5) The CDi can at any time obtain the encryption key from AS satellite broadcasts by measuring any of a number of parameters $\theta_i$ (see Sec Communication using dynamically changing encryption keysknown to no human above). To do this the CDi uses a receiver that is able to measure the desired parameter $\theta$ from the signal broadcast by the AS satellite. CDi too is now ready for secure transmissions.

The AS signal receiver on the CDi is here and in the rest of the exemplary applications, analogous to a regular GPS receiver. It can in effect be a standard GPS receiver modified to receive also the Authentication Satellite broadcast. The AS signal receiver may therefore (depending on the frequency band and bandwidth) fit inside a regular cell phone and be within the technical and power budget of a cell phone. However, the satellite signal coverage and intensity (power level per unit area) should be similar to that of a standard GNSS satellite. This may be more than afforded by a small sat., at least if a large number of phones are simultaneously used in the mode described in 3.a of the list herein above.

What this ensures is that the communication cannot be eavesdropped. It cannot guarantee that the person holding the cell phone is who they pretend to be, which is a different type of security issue. However, the secure link mode may be used to communicate data used to identify the person including passwords and biometric data. This sensitive information is secure from identity theft during the transmission.

Obviously a secure link can be established between any two phones or other Communication Device (CD) via the secure communication provider who serves as a link between the two CDs using the keys specific to each CD to effectuate the link. A CD may send a message to update its coordinates during the conversation should the user move.

We note that just as in the other exemplary applications, keys can be continually updated. If the downlink of encryption keys causes a bandwidth bottleneck, as it is likely to in the mode described in 3.a. The bottleneck could be relieved by resorting to option 3.b whereby the satellite transmits, not the codes or keys, but its position $X_s$, $Y_s$, $Z_s$ through the secure link to the Main Station (MS). The encryption keys corresponding to any coordinate $X_i$, $Y_i$, $Z_i$ can now be generated at the secure communication provider's secure ground station MS at no loss of security.

Pay TV Piracy Mitigation

Pirate free Pay TV could be implemented analogous to any other digital communication between two Communication Devices CDi and CDj, probably best using option 3.b. This requires customer specific encryption and most likely, this would be done on intermediary Relay Devices RD (stations or servers). We may envision the broadcast and AS coordinates $X_s$, $Y_s$, $Z_s$ reaching the relay device RD encrypted using $\theta_i$ to generate keys. A processor at the relay device then re-encrypts the broadcast using the $\theta_i$ based keys before forwarding the Pay TV signal to the customer using CDj. We note that the CDi should best be integrated in the device generating a picture/sound, preferably in a common ASIC so no decrypted signal is available for a malicious user of CDi to tap.

The Next Level in TV and Internet Security for the User AND the Provider

The AS/MS/RD/CDi[i=1 . . . n] setup described in the previous section herein above is suitable for a two way secure digital communication that could be used to address and provide vital security increasingly wanted by customers of internet streams as well as Pay TV and video and simultaneously desired by service providers. We propose the next level in TV and Internet security for the user AND the provider: Individualized internet content and Pay TV services. In this scenario customer j using CDj will know if a message was sent from CDi where i represents any accepted communicator and they can block unwanted CDs or sights. This is likely the future of the internet.

Data Storage/Database Applications

Given the difficulty to find small satellites the size of decimeters once they reach orbit, these or similar satellites are also well suited as repositories of security sensitive data. In addition the satellites' small mass to surface area ratio and no vital protrusions makes them rugged and difficult to destroy before the satellites eventually deorbit naturally and plunge into the atmosphere where they disintegrate at the end of their orbital lifetime. This stealth and ruggedness of small satellites in the vastness of Low Earth Orbit space is similar to a light bulb floating in the ocean. A decimeter size satellite in LEO is even more difficult to find than a light bulb at sea, and they survive most natural or manmade attempts at destruction due to their tiny size. A shoot-down attempt which would rip off solar panels and antennas from most satellites simply displaces these satellites to different orbits. They simply keep going along new orbits and self-determine their position using the GPS receiver.

Government Administrative Databases and Similar

A cubesat can for example hold the entire Cadastral of most countries, or it could hold full passport data with photos and biometrics. As an example, the digital cadastral land entry such as stipulated by Uganda's ministry of Lands Water and the Environment in 2006 uses less than 40 kB each. That means that some 75 million cadastral entries could fit in a 3 TB stack of Solid State Drives (SSDs). This should be adequate even for a large population such as Uganda's 34.5M population (2011 estimate, World Bank). Commercially available 0.5 TB Solid State Drives (SSDs) in the standard 2.5 inch format (69.85 mm×100 mm×7 mm) are available using only 0.068 W (working)/0.042 W (idle) and fit inside the form factor of the cubesat standard. We envision stacking seven of these drives for a total of 3.5 TB capacity whereof at least 3 TB would be usable for record storing. This uses approximately half the space in a 1U cubesat module. Redundancy and self repair would be achieved using multiple satellites communicating directly with one another or by way of an authorized ground station or Main Station (MS).

Figure 4:
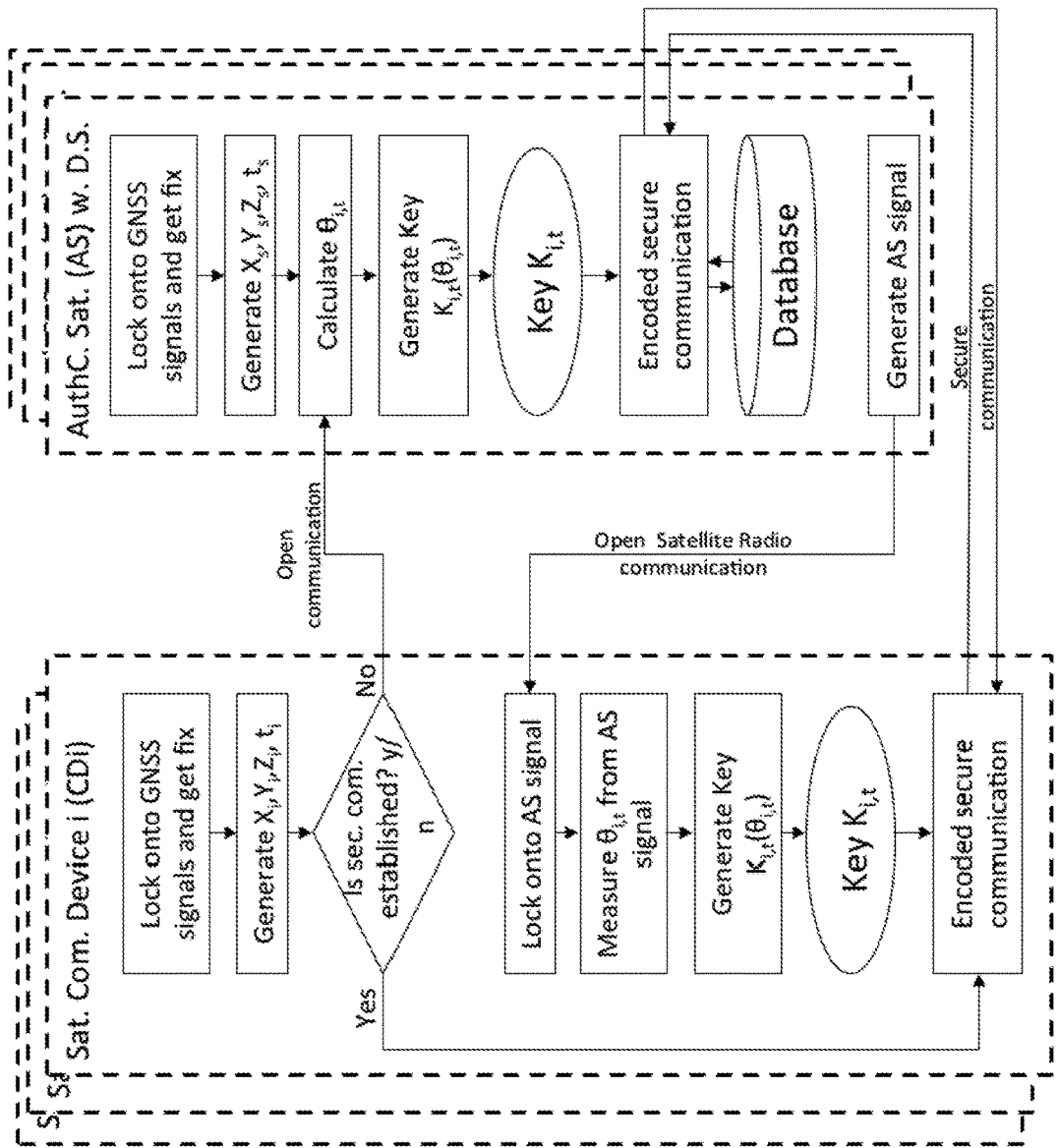
FIG. 4 illustrates a flowchart for a secure communication between Satellite Communication Device i and an Authentication Satellite with data storage.
Figure 5:
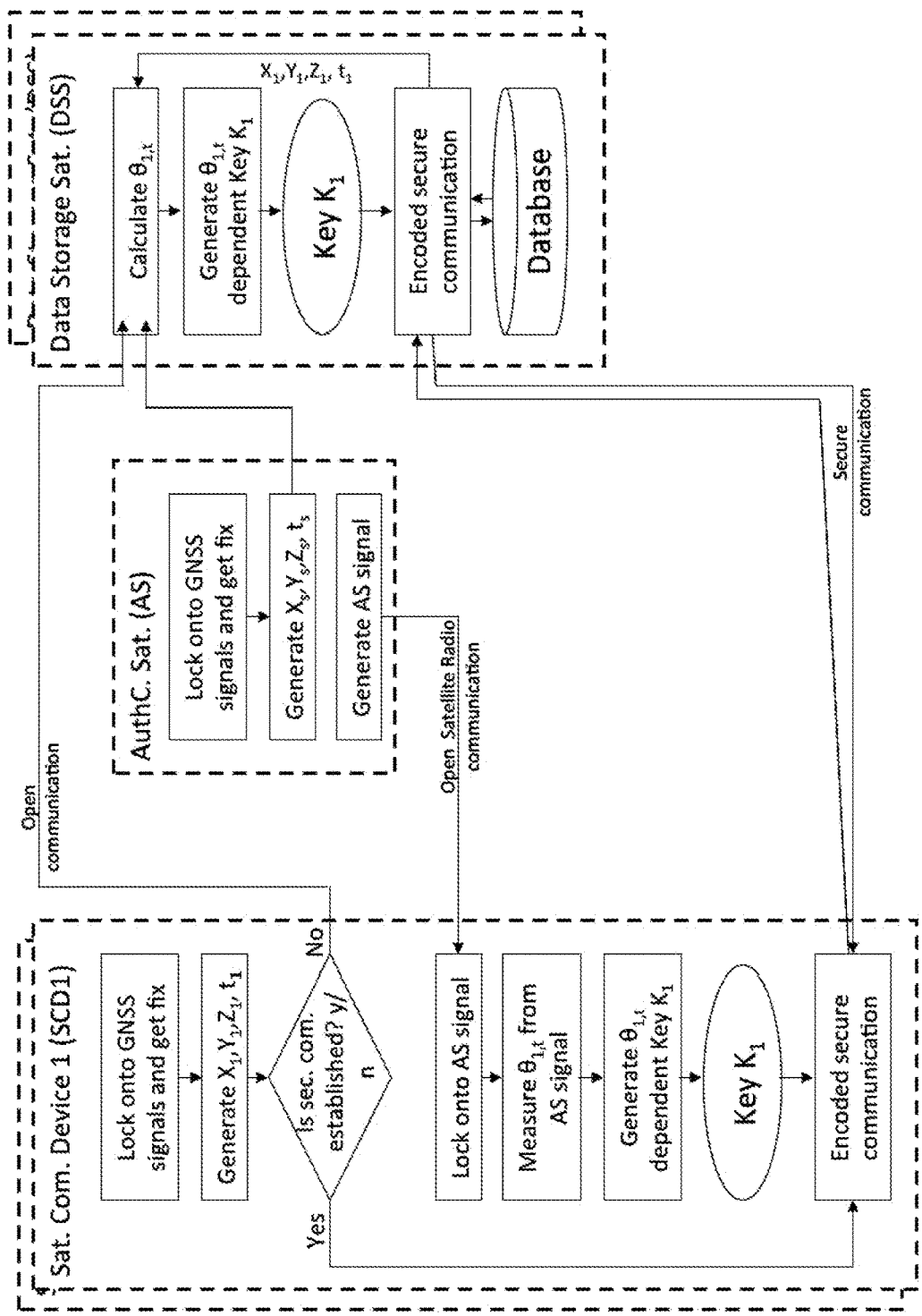
FIG. 5 illustrates a flowchart for a secure communication between Satellite Communication Device 1 and an a Data Storage Satellite using SBA.

We envision tree or more data storage satellites and one or more encryption key satellite in a typical configuration where the satellites communicate with one another but a simple implementation showing the basic process is illustrated in FIG. 4. An alternative with separate data storage satellites is illustrated in FIG. 5. The storage satellites may communicate by way of a relay satellite whose orbit or range is not used for the encoding. A relay satellite may anyway be the preferred means of communication due to power budget considerations. Inter satellite communications are likely to use aimed laser beams to preserve power and yet achieve high bandwidths. High bandwidth communications as needed, for example the amount of data (up to 3.5 TB) mentioned in this example cannot be transferred based on today's mainstream cubesat communication technology because the bandwidth, limited by power, is several orders of magnitude too low to be tractable. We expect any high bandwidth communications using low power to use aimed beams and therefore require positional awareness at both ends. We may anticipate technical solutions, possibly using laser communications for data transfers. Laser communications of the type we envision concentrate their energy in narrow beams, which in practice precludes large area coverage and therefore presupposed positional awareness. This is best for inter satellite communications although a test of the technology on satellite to ground broadcasts was funded by NASA in 2012 ("Integrated Optical Communications and Proximity Sensors for Cubesats," Siegfried Janson, Aerospace Corp., El Segundo, Calif., http://www.photonics.com/Article.aspx?AID=51632). We note that NASA also is funding use of the solar panel structure to increase antenna gain on cubesats ("Integrated Solar Array and Reflectarray Antenna (ISARA) for High Bandwidth CubeSat," Richard Hodges, NASA Jet Propulsion Laboratory, Pasadena, Calif., partnering with Pumpkin Inc. of San Francisco.). A relay satellite with the power to broadcast high bandwidth over large areas still will likely be a preferred solution in practice.

Cadastral Data Integrity

In an exemplary embodiment, a satellite is only accepting data encrypted with a key corresponding to the $\theta_{MS,t}$ associated with a Main Site (MS) at one or more predefined secure broadcast locations in a preselected timeslot when that location is scheduled to be secure. This could be at the ministry of land management if the satellite is used for cadaster or at any other secured site.

If cadastral data is to be accessed and modified from a field station, the location (coordinates) and time when this update will be made is selected and transmitted to the satellite from the main site. The place and time could be those of a public meeting announced to stakeholders and organized by elders or elected leaders. Access to the cadaster can then be granted from that site and modification to the database may be allowed from that site alone during the timeslot of the meeting.

Authentication Through Encoded Integrity Signal

The collection of data that have legal or economic significance, often both, need typically to be checked in what often turn into expensive processes before they can be accepted. These data records can be Cadastral land measurements or they could be soil samples or other samples used for example in environmental compliance testing.

There is a need to know if an alleged measurement claimed to be obtained at a given site, was actually collected in the field and was collected within a prescribed observation period, using an adequate residency time and prescribed procedures.

Cadastral Data Update by Stakeholder or Similar Maintenance Issues

Figure 6:
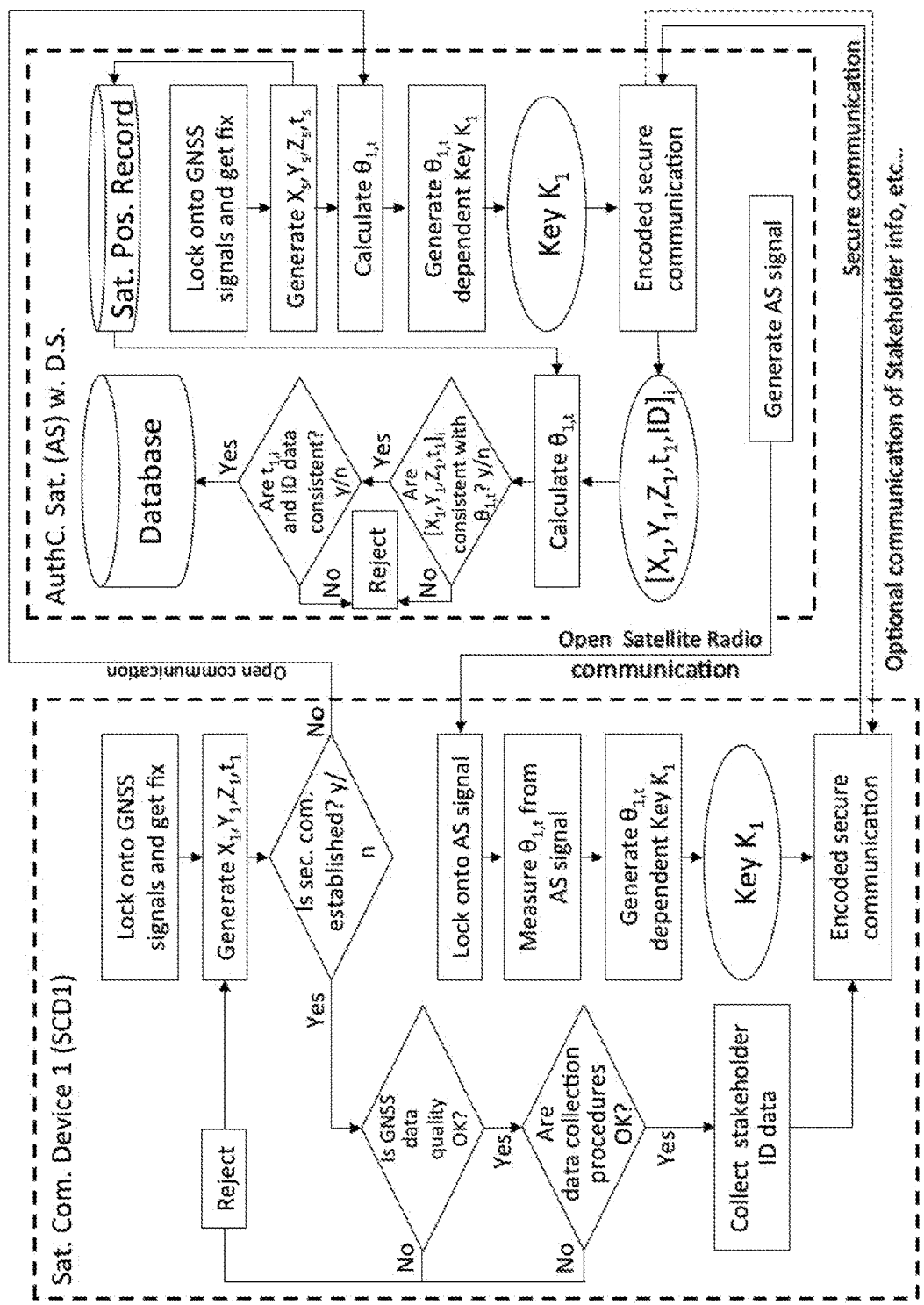
FIG. 6 illustrates a flowchart for a secure position and stakeholder sensitive data collection and storage in an Authentication Satellite with Data Storage.

By encoding cadastral data such as owner or plot number using the encryption key obtained from the AS observable, the encrypted data cannot be changed and will only be accepted if the encryption key is consistent with the survey coordinates and if the time span of the measurement and therefore, the encryption key, corresponds to the prescribed residency time. This test can only be made using the encryption satellite AS (or the main station MS when applicable) where the record will eventually either be accepted or refuted. We illustrate the process in FIG. 6. For this purpose the satellite needs access to historical position data as a function of time. We may use a single 0.5 TB SSD to store position information at 100 Hz (100 3D coordinates per second) to cover the full 3 year lifetime of the satellite, even uncompressed or compressed with a simple algorithm so that all encryption keys created during its orbital lifetime could always be recreated. The key matching $\theta$ remains the means to either accept or refute data. The historical position data could as an alternative be distributed and stored in the data storage satellites to allow the acceptance test to be done there. We note that this transmission could use a secured site MS as a relay station or be transferred directly between satellites in which case the signal is directed and not broadcast toward the ground where it could be intercepted. We envision using pulsed laser beams for high volume communications; this becomes possible because of precision position available at the satellites but requires precise attitude control or other means to aim the beams. Star guides and similar systems with adequate performance are available on the market.

Environmental Samples and Similar Data Collection Applications

Soil Sample Collection Using a Chambered-Type Russian Corer

Figure 7:
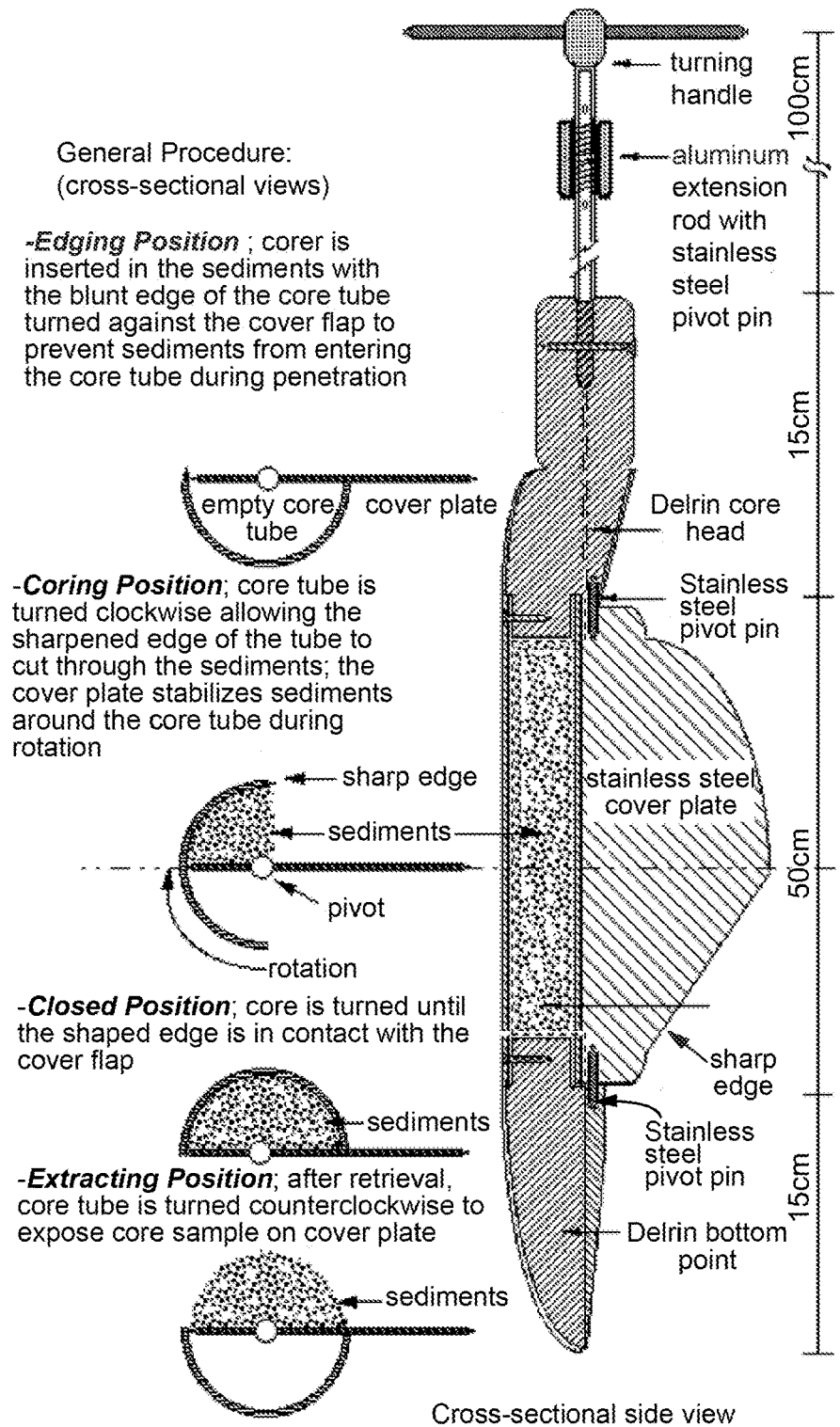
FIG. 7 contains an Illustration of a Russian Corer with a sampling chamber and its use.

A soil sample collection using a chambered-type Russian corer (see FIG. 7) can also be temper mitigated using authentication through an encoded satellite integrity signal once a GNSS receiver capable of sampling the integrity signal is fitted. In a simple form the core chamber is locked or sealed using an electronic lock who's encryption key needs to match the claimed site and time the sample was collected. It is possible to include depth information using the precision GNSS that is used to get the site coordinates. A procedure could be to collect the GNSS determined coordinates including altitude or elevation as soon as a torque is sensed on the sampler but these are only accepted if the horizontal coordinates remain within a set tolerance. All samples do not necessarily get acceptable depth information using this procedure but correctly collected samples should. To accept the sample as authentic, the electronic data record needs to be transferred to a satellite with historical encryption satellite positions. The data and associated sample are accepted only if the decryption key works, i.e., the $\theta$ parameter derived encryption key matches the position as given by the GNSS data. Similar principles can be ported or adapted to other sampling applications and devices. Some steps cannot always be taken and may need to be replaced or omitted. For example tissue samples from cattle may require that an RFID or other tag be read.

Anti Deliberate Sample Tampering

Figure 8:
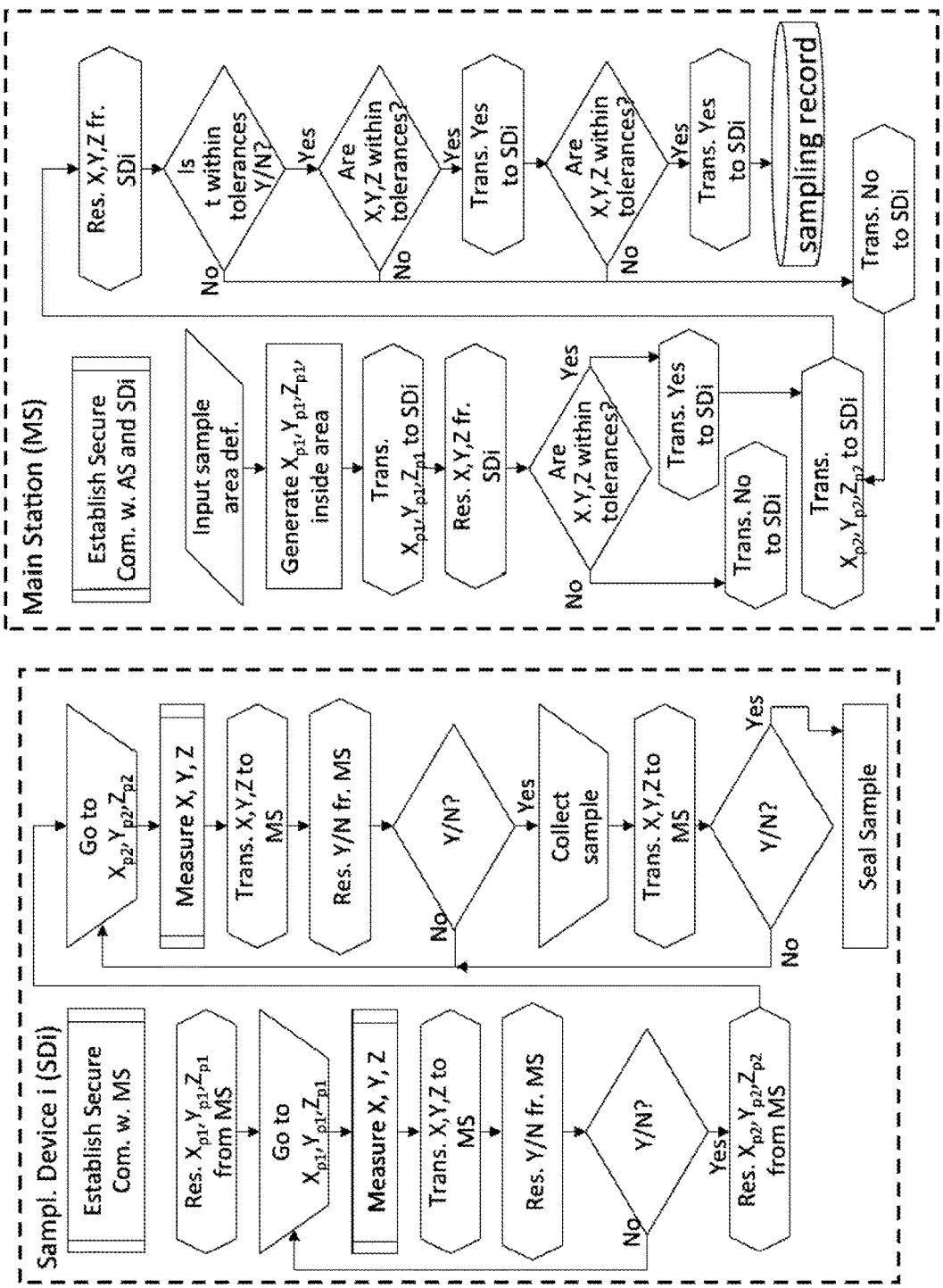
FIG. 8 shows a flowchart for a sample collection using SBA with a Main Station. Some or all of the MS functions could be moved to the AS satellite or to a slave satellite.

The device in the example of the previous section can also be used in the case environmental samples are to be collected from a defined sampling area but sample tempering needs to be ruled out. Further, the sample collection can be accomplished by a workforce that needs no more than an hour of training and essentially no supervision, using the operation illustrated in the flow diagram in FIG. 8. Assuming that the general area to be sampled could be public knowledge, only a mathematical description of the sampling area with optional sampling density requirements etc. . . . , need to be defined and programmed into our custom GNSS receiver's controller. The GNSS and Russian corer combination is handed to a person charged with collecting samples, who starts by acquiring a position fix which is saved with all other data for that sample collection session.

The time and location combination is unique to that sample run and is represented as in the examples above by the key derived from θ or any combination of measurements of the AS signal (e.g., Range differences, Doppler shifts, etc.). The parameter θ is used this time as a seed in a random number generator to select a location in the sampling area. That location is not displayed or made known in any other way; the display simply gives directions similar to a GPS navigator in a car. Once the location is reached within a predefined tolerance, the data sampling can begin and the actual location will be recorded as in the previous section.

The electronic data recorded in conjunction with the sample collection is sent to the satellite for integrity check before the sample is accepted by the system. The data encryption must match the coordinates and time recorded or decryption will not work. The θ parameter used in the decryption key is calculated from the stored satellite position data and is not known by any operators of the system.

It is possible that an attempt be made to manipulate the sample by bringing a load of clean soil along. To record this and similar manipulation attempts, our apparatus may be fitted with a camera that records the penetration point and its environment at the moment the ground is penetrated as evidenced for example by torque applied to the Russian corer. In addition, our Russian corer must collect soil from below ground level which makes soil tampering more difficult, especially in a region with known elevation. To avoid the preparation of the site by replacing the soil to be sampled with clean soil and covering it up, we may resort to a time limiting procedure: Once the sampling site has been reached, a new fix is obtained and a new sampling site is selected close by, again using the random number generator and a seed from the θ parameter. There is now a fixed time span allocated to get to the specific site and start the sampling procedure. The start of the sampling procedure is recognized as the moment the Russian corer feels a torque indicating that it penetrates ground and the photograph is taken or video starts. From here on, the integrity of the sampling process is maintained as in Section soil sample collection using a chambered-type Russian corer. A new sample site must be selected, using the same procedure as above, if the depth determination is unsuccessful which could for example be if the device does not maintain satellite tracking during the procedure or if the drilling direction has excessive tilt.

Variations on this theme to improve integrity are many. One can for example prescribe that an area in effect be surveyed for elevation variations before the last call is made to the random number generator. The actual site is not yet selected when the elevation measurements are made. However, one is within a known distance to the actual sample site so the area to survey is known.

Restricted Access Applications

Assume that the cargo in a mobile container or oil tanker truck needs to be accessible only at the destination and for inspection at checkpoints established along the route and at border crossings. Access to the cargo should be locked except for the combination of those locations and times when they are manned. The driver should have no means to grant access at other combinations of place and time. To mitigate the possibility of corruption, there also should be no way a key, a code, or other means of granting access could leak out. Again, we resort to the AS satellite signal and this is how it could be applied:

Information on coordinates and times as well as an identification of the device to be controlled and unlocked at these sites and times are sent from a Main Site (MS) to the AS satellite. At the specified times, the satellite broadcasts an "unlock code" but again encrypted using as part of the encryption key a quantity that depends on the parameter θ associated to the site in question. Similarly to our other examples whereby secure data was granted access from the ground, the device on the ground can measure the parameter θ and deduce this encryption key and therefore obtain the "unlock code". The device then applies the code to grant access to the cargo. The device identity can also be part of the encryption key. This identity code may have been generated by the satellite and may therefore remain unknown to any person including the staff and managers. In addition, we note that the ID key alone does not unlock the code; the function of this code is in part to allow individualized control over containers while broadcasting the encrypted signals over a broad area. These codes assure that the "wrong" container not be unlocked. Another important function is discussed in the answer to Question 2. The device stays locked in its default mode but it may upon demand at anytime measure the parameter θ and try the thus generated encryption key. That key will only work at the preprogrammed sites. The conditions for granting access can only be modified from the main site.

Question 1

What if a perpetrator managed to record the authenticity signal at a time and in a location where it grants access, could they rebroadcast it to gain access? (We note that the recording would have to be from one of these sites when the site is secured, i.e. manned and in operation mode.)

Answer:

The authenticity signal can include the similarly encrypted GPS time that the encryption satellite obtains from its precision GPS receiver. A rebroadcasted signal results in the reception device noticing that the time of broadcast is not current and the message can be rejected. It can do so by consulting its own clock or by checking for the condition that the time of that message is later than that of any other reception.

Question 2

What if the perpetrator manages to build a satellite or a pseudo satellite to mimic the integrity signal?

Answer:

To avoid such intrusions, we may make use of some information that is shared by the AS satellite and the device on the ground and use that information as part of the encryption key. This information is stored inside the ground device and cannot be read out. The shared information could be the device ID and this ID can be generated in the AS satellite and safely be transferred to the ground device using the same scheme as in the section Anti deliberate sample tampering herein above.

Secure Locking/Unlocking Devices

Could smartphones be used as the key to our cars, front doors etc. . . . ? is a question asked and answered by researchers from the Fraunhofer Institute for Secure Information Technology SIT in Darmstadt in an article—http://www.rdmag.corn/nesms/2013/01/turning-smart-phones-secure-and-versatile-keys?et_cid=3040791&et_rid=54735819&linkid=http%3a%2f%2fwww.rdmag.com%2fnews%2f2013%2f01%2fturning-smartphones-secure-and-versatile-keys—
in R&D (Jan. 14, 2013) as they offer an app called ShareKey. But the technology the FI-SIT offers is incomplete. However, enhanced with SBA, ShareKey and systems like it could potentially be applied to help administer car-sharing schemes and other emerging applications as the trend towards a 'shareconomy' may be facilitated and boosted by SBA as its main enabling technology.

Geo-Referenced Rights

We may envision a future where rights may be granted depending on the fact that you are at a specific, potentially secured site, as evidenced by the coordinates, time and θ parameter in your communications with a MS or an AS using a CD. This may give you further rights that may be location and/or time limited. Or emergency response may give you instructions and rights that help manage crowds in evacuation processes. Instructions on evacuation routes given over a CD can accept and decrypt only instructions that were meant for your location. Even promotional messages may depend on where you are. The rights could be physical access, permission to use equipment, or may give you right to data access. These could for example be records only made available in a certain location and time and maybe only when some other person(s) is/are known by the SBA to also be present. As an example, a will might only be read when all stakeholders are present and a guardian may only be allowed access to for example the home of an elderly or other dependent in his care or granted access to their medical records in the presence of the stakeholder(s). One can easily imagine the usability of high level security of this type but also lower levels rather than meeting all the requirements possible to impose. FedEx and similar courier services may prove where and when a package was delivered. A courier or parcel lock may be set to only unlock once it reaches the destination. Or a minor may only have access to data, a movie, a bank account, or may only operate a vehicle when a parent or guardian is present. A driver may only have access to a vehicle during certain hours, maybe only to drive to work. The SBA system could be set to inform when and from where a felon accesses a bank account.

The invention claimed is:

1. A method for deducing a quantity, in two distinct locations, from further distinct measurable quantities, the method comprising the steps of:
   providing a first device at a location with first coordinates;
   providing a second device at a location with second coordinates;
   transmitting a signal by the second device; and
   intercepting the signal by the first device and observing with the first device the quantity from the intercepted signal;
   wherein the second device measures the second coordinates and is informed of the first coordinates of the first device, the measured second coordinates representing a chaotically time-varying signal, to calculate at the second device the quantity that can be obtained from measurements by the first device;
   the quantity thereby being known by the second device and the first device.

2. The method according to claim 1, wherein the quantity is a range from the first device to the second device.

3. The method according to claim 2, further comprising the steps of:
   observing with the first device the quantity using a predefined algorithm so that the quantity is known by the first device;
   each location illuminated by the signal broadcast by the second device having an associated quantity at time t and each combination of first coordinates time and second device corresponding to a given quantity, each of the associated quantity and the given quantity being a number of arbitrary length that can be created by joining numbers where t refers to a given time and the joining numbers represents a value for the quantity obtained at time t, and the number being unique depending on the definition of the quantity and the mechanism generating the time dependency.

4. The method according to claim 2, wherein measurement using the signal transmitted by the second device does not permit ambiguity resolution of the range, and an algorithm that generates the quantity from at least a portion of a number obtained from the range of the accurately measured distance can be used to generate a specific value for the quantity that is also predictable with the information known to the second device, the determination of the second coordinates of the second device from the signal broadcasts is precluded due to ambiguity, so that the quantity is only known at the first device and the second device.

5. The method according to claim 1, wherein the quantity is a function of the frequency of a carrier or of an embedded code of the carrier, the method further comprising the steps of:
   measuring with the first device the frequency of the intercepted signal at the location with the first coordinates and corresponding velocity components at time t; and
   transmitting with the second device at a further frequency known to the second device from the location with the second coordinates and the corresponding velocity components also at the time t;
   wherein the second device only needs to be informed of the coordinates and velocities of the first device to calculate the Doppler shifted frequency that can be observed at the first device; and
   the quantity is assigned a numerical value based on the Doppler shifted frequency using a predefined algorithm so that the quantity is also known by the second device.

6. The method according to claim 1 further comprising the steps of:
   using the quantity to generate an encryption key known only at the first device and the second device to allow secure communications between the second device and the first device; and
   repeating the preceding step of using the quantity to generate an encryption key for any number of first devices, each of which has a corresponding quantity and encryption key,
   wherein all encryption keys are known at the second device, which allows secure communication by way of the second device where each encryption key is used to decrypt a message from the corresponding first device, and the message is then encrypted with a different key and sent to the first device corresponding to the different key.

7. The method according to claim 6 further comprising the steps of:
   securely communicating the information used by the second device to generate the encryption keys, to any first device, which is now capable of generating any key; and
   using a site as a relay station allowing secure communication between any first device with any other first device.

8. The method according to claim 6, the quantity or the encryption key is used to verify the location of the first device, further comprising the steps of:
   using one or more second devices to create each a corresponding quantity or encryption keys, thereby enabling a consistency check on the origin of the message, a second device or site may perform a check on the consistency between the quantity or encryption key with a certain location of the communicating first device;

using of three or more second devices to enable a determination of the location of a ground based communicating first device; and using of four or more second devices to enable an estimate in the accuracy of the calculated first coordinates for first device.

9. The method according to claim 6, whereby the message can only be decrypted at a given location or combination of location and time, wherein the message is at least one of a key, a means to manipulate text, computer codes, and locks.

10. The method according to claim 9, wherein the coordinates of the first device are transferred to the second device using an encrypted transferring message.

11. The method according to claim 10, wherein the message is sent to multiple destinations to avoid mapping of message traffic, the message being only decryptable at the location of the intended recipient.

12. The method according to claim 1, wherein the step of causing the second device to transmit a signal makes use of a swept narrow beam, the narrow beam produced such that a carrier beam ground footprint lies in the meter range, and the quantity of the narrow beam cannot be deduced outside of the narrow beam, the method further comprising:

sweeping the narrow beam over an area of interest until a key is received by a receptor.

13. The method according to claim 1, further comprising the steps of:

associating a person or set of persons with the first device using an association method; and identifying the device, the person, or the set of persons to reprogram the device or assign rights to the person or the set of persons.

14. The method according to claim 13, wherein when a person or set of persons is proven to be associated with the first device and is assigned right to generate or modify cadastral data, and/or is assigned voting rights or other rights, the quantity is being used to generate directives.

15. The method according to claim 1, further comprising the step of:

sending coordinates to the first device that allows the second device to control the location of the first device and testing the association or control a person has over the first device, assign a site for sample collection or other activity.

16. The method according to claim 1, wherein the second device is located on a chaotically moving platform observable from the first device such that the measured second coordinates represent the chaotically time-varying signal.

17. The method according to claim 16, wherein the second device is located on an orbiting satellite with chaotic orbit, and the quantity is an unpredictable time variable numeric that can be used as a number generator free from human influence.

18. The method according to claim 1, further comprising the step of:

generating authenticated cadastral records based on the quantity.

19. The method according to claim 1 further comprising the step of:

generating authenticated samples based on the quantity.

20. The method according to claim 1, wherein the second device is a space vehicle, further comprising the step of:

securely storing data at the space vehicle for later retrieval.

21. The method according to claim 1, wherein the quantity is based on a least significant portion of a measurement made by the first device from the intercepted signal.

22. The method according to claim 1, wherein the quantity known by the first device and the second device is truncated so that only the chaotically varying portion of the quantity is retained.

* * * * *